US010728295B2

(12) United States Patent
Gouache et al.

(10) Patent No.: US 10,728,295 B2
(45) Date of Patent: Jul. 28, 2020

(54) METHOD FOR OPERATING A CACHE ARRANGED ALONG A TRANSMISSION PATH BETWEEN CLIENT TERMINALS AND AT LEAST ONE SERVER, AND CORRESPONDING CACHE

(71) Applicant: InterDigital VC Holding, Inc., Wilmington, DE (US)

(72) Inventors: Stephane Gouache, Cesson Sevigne (FR); Remi Houdaille, Cesson Sevigne (FR); Charline Taibi, Chartres de Bretagne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 443 days.

(21) Appl. No.: 14/732,614

(22) Filed: Jun. 5, 2015

(65) Prior Publication Data
US 2015/0358418 A1    Dec. 10, 2015

(30) Foreign Application Priority Data

Jun. 5, 2014 (EP) .................................... 14305857

(51) Int. Cl.
*G06F 15/167* (2006.01)
*H04L 29/06* (2006.01)
(Continued)

(52) U.S. Cl.
CPC .......... *H04L 65/4084* (2013.01); *H04L 65/80* (2013.01); *H04L 67/02* (2013.01);
(Continued)

(58) Field of Classification Search
CPC ... H04L 67/2842; H04L 65/80; H04L 45/742; H04L 65/605; H04L 65/608; H04L 67/28;
(Continued)

(56) References Cited

U.S. PATENT DOCUMENTS 8,078,574 B1 * 12/2011 Malmskog .......... H04L 67/2842
707/609
8,639,710 B2 * 1/2014 Arnold .............. G06F 16/24552
707/759
(Continued)

FOREIGN PATENT DOCUMENTS

| CN | 101377788 A | 4/2009 |
|---|---|---|
| CN | 101401079 A | 4/2009 |
| WO | WO2013057315 | 4/2013 |

OTHER PUBLICATIONS

Taibi et al: "Making DASH cahce friendly",107. MPEG Meeting; Jan. 13, 2014-Jan. 17, 2014;(Motion Picture Expert Group or ISO/IEC JTC1/SC29/WG11),n°. m32269, Jan. 11, 2014 (Jan. 11, 2014); pp. 1-7.

(Continued)

*Primary Examiner* — Dustin Nguyen
*Assistant Examiner* — Hao H Nguyen
(74) *Attorney, Agent, or Firm* — Myers Wolin LLC

(57) ABSTRACT

First type cache adapted to be arranged between a client terminal and at least one server, which:
is configured to receive, from the client terminal, a request for a first representation of a segment of a multimedia content, said multimedia content being available in a plurality of representations,
and comprises a module configured to send a response to the client terminal which comprises:
one alternative representation of said segment, which is cached by said first type cache;
first additional information preventing a second type cache—arranged between the first type cache and the client terminal—from caching the alternative representation of said response; and
(Continued)

second additional information identifying the alternative representation of said response, allowing a further first type cache to cache said alternative representation.

11 Claims, 3 Drawing Sheets

(51) Int. Cl.

| | | |
|---|---|---|
| *H04L 29/08* | (2006.01) | |
| *H04N 21/2225* | (2011.01) | |
| *H04N 21/239* | (2011.01) | |
| *H04N 21/2343* | (2011.01) | |
| *H04N 21/442* | (2011.01) | |
| *H04N 21/845* | (2011.01) | |
| *H04N 21/6338* | (2011.01) | |
| *H04N 21/262* | (2011.01) | |

(52) U.S. Cl.
CPC ..... *H04L 67/2842* (2013.01); *H04N 21/2225* (2013.01); *H04N 21/2393* (2013.01); *H04N 21/23439* (2013.01); *H04N 21/26258* (2013.01); *H04N 21/44209* (2013.01); *H04N 21/6338* (2013.01); *H04N 21/8456* (2013.01)

(58) Field of Classification Search
CPC . H04L 67/288; H04L 69/22; H04N 21/23439; H04N 21/2393
USPC ............... 709/203, 213, 217, 224, 226, 231; 707/609, 713, 759, 769
See application file for complete search history.

(56) References Cited

U.S. PATENT DOCUMENTS

| | | | |
|---|---|---|---|
| 8,683,542 B1 | 3/2014 | Henry | |
| 2004/0240386 A1* | 12/2004 | Irudayaraj | H04L 45/742 370/235 |
| 2007/0214320 A1* | 9/2007 | Ruia | G06F 12/0811 711/119 |
| 2008/0005273 A1* | 1/2008 | Agarwalla | G06Q 10/025 709/217 |
| 2008/0192820 A1* | 8/2008 | Brooks | H04N 7/17318 375/240.02 |
| 2012/0254456 A1* | 10/2012 | Visharam | H04N 21/2343 709/231 |
| 2012/0284371 A1 | 11/2012 | Begen et al. | |
| 2013/0173737 A1* | 7/2013 | Liu | H04N 21/23439 709/213 |
| 2014/0013003 A1 | 1/2014 | Giladi | |
| 2014/0019587 A1 | 1/2014 | Giladi | |
| 2014/0095730 A1 | 4/2014 | Ozgur | |
| 2014/0229529 A1* | 8/2014 | Barone | H04L 65/4076 709/203 |
| 2014/0344890 A1* | 11/2014 | Warrick | H04L 63/0281 726/1 |
| 2014/0365677 A1* | 12/2014 | Mueller | H04L 65/80 709/231 |
| 2016/0352857 A1* | 12/2016 | Gouache | H04L 65/4069 |
| 2017/0230442 A1* | 8/2017 | Denoual | H04L 67/02 |
| 2018/0124016 A1* | 5/2018 | Ong | H04L 63/0263 |

OTHER PUBLICATIONS

Search Report dated Dec. 3, 2014.

* cited by examiner

METHOD FOR OPERATING A CACHE ARRANGED ALONG A TRANSMISSION PATH BETWEEN CLIENT TERMINALS AND AT LEAST ONE SERVER, AND CORRESPONDING CACHE

This application claims the benefit, under 35 U.S.C. § 119 of European Patent Application No. 14305857.6, filed Jun. 5, 2014.

TECHNICAL FIELD

The present invention relates generally to the domain of the adaptive streaming technology over, for instance but not exclusively, HTTP (HyperText Transfer Protocol) and, in particular, to the operation of a cache arranged along the transmission path between client terminals and remote servers.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Adaptive streaming over HTTP (also called multi-bitrate switching or HAS) is quickly becoming a major technology for multimedia content distribution. Among the HTTP adaptive streaming protocols which are already used, the most famous are the HTTP Live Streaming (HLS) from Apple, the Silverlight Smooth Streaming (SSS) from Microsoft, the Adobe Dynamic Streaming (ADS) from Adobe, the Dynamic Adaptive Streaming over HTTP (DASH) developed by 3GPP and MPEG (standardized as ISO/IEC 23009-1:2012).

When a client terminal wishes to play an audiovisual content (or A/V content) in adaptive streaming, it first has to get a file describing how this A/V content might be obtained. This is generally done through the HTTP protocol by getting a description file, so-called manifest, from an URL (Uniform Resource Locator), but can be also achieved by other means (e.g. broadcast, e-mail, SMS and so on). The manifest—generated in advance and delivered to the client terminal by a remote server—basically lists the available representations (also called instances or versions) of such an A/V content (in terms of bitrate, resolution and other properties). A representation is associated with a given quality level (bitrate).

The whole data stream of each representation is divided into segments (also called chunks) of equal duration (accessible by a separate URL) which are made such that a client terminal may smoothly switch from one quality level to another between two segments. As a result, the video quality may vary while playing but rarely suffers from interruptions (also called freezes).

At the client side, the segments are selected based on a measure of the available bandwidth of the transmission path. In particular, a client terminal usually requests the representation of a segment corresponding to a bitrate encoding and thus a quality compliant with the measured bandwidth.

When a cache is along the transmission path between a client terminal and a remote server, one representation of a given segment may already be stored in said cache, in case another client has previously requested the same segment with the same representation or in case a Content Delivery Network (CDN) has already provisioned the segment in the cache. Thus, the response to an HTTP request for said given segment is faster than if the segment comes from the remote server and duplicate transmission can be avoided, effectively saving network resources.

Nevertheless, the HTTP adaptive streaming appears not to be cache friendly (or at least less cache friendly than the so called layered base switching as for instance H264-SVC). Indeed, if a first client terminal requests a representation r of a given segment and a second client terminal—sharing a part of the transmission path with said first client terminal and a cache—requests a representation of said given segment (at a higher or lower quality), then the cache is not hit leading to higher load on the network segment between the cache and the server with the risk of causing congestion. The benefits of caching are then completely annihilated and caches are currently unable to improve this situation.

To overcome this shortcoming, it is known that a client terminal may send a request for a given segment comprising a first (also called preferred) representation and one or several alternative representations. When such a request arrives at an HAS aware cache (meaning that said cache is compliant with an HAS protocol, such as MPEG-DASH), said cache delivers the first representation if cached or browses the alternative representations in case the first representation is not cached. When one of the alternative representations is cached, the cache sends said alternative representation to the client terminal. Nevertheless, as for many new technologies, the gradual deployment of DASH aware caches (so called smart caches or DANES for DASH Aware Network Element) requires their coexistence with current caches which are not DASH aware (so called legacy caches). Such a coexistence raises new issues to be addressed, in particular when a given DANE replies to a HTTP request with one representation amongst the first representation (if cached) or the alternative representations listed in said request. When an intermediate legacy cache—located between the client terminal and the given DANE—receives the response sent by the DANE, it might store it as the first representation. When the returned response sent by the DANE does not correspond to the first representation but rather to one of the alternative representations of the request, said intermediate legacy cache might be misled. As a consequence, upon receipt of a further request for said first representation of the same segment from another client terminal, the intermediate legacy cache will erroneously answer with the cached alternative representation, believing that it has previously cached the first representation. The intermediate legacy cache is not aware of the substitution made by the DANE.

The present application invention overcomes at least the above mentioned drawback to prevent intermediate legacy caches from wrong caching.

SUMMARY

The invention concerns a method for operating a first type cache adapted to be arranged between a client terminal and at least one server, said first type cache being configured to receive a request from the client terminal for a segment of a multimedia content available in a plurality of representations, said method comprising:
  receiving, from the client terminal, a request for at least a first representation of a segment,
and is remarkable in that it further comprises:

sending, to the client terminal, when the first representation is not cached by said first type cache, a response comprising:
one alternative representation of said segment, which is cached by the first type cache;
first additional information preventing a second type cache—arranged between the first type cache and the client terminal—from caching the alternative representation of the response; and
second additional information identifying the alternative representation of the response.

Thus, thanks to the present invention, any further first type cache—located between the first type cache sending the response and the client terminal—may know that the delivered representation of the segment does not correspond to the first representation requested, but rather to an alternative representation. Thus, such a further first type cache may correctly cache the delivered alternative representation. In addition, second type caches—arranged between the first type cache sending the response and the client terminal—could not store the representation of the response sent by the first type cache. It prevents such second type caches from later delivering—in response to a further request of another client terminal also requesting the first representation for the same segment—the alternative representation believing that it is the first representation.

In an embodiment of the present invention, preliminary to the sending, said first type cache checks whether it has already cached one alternative representation of said segment in case the first representation is not cached.

In particular, said at least one alternative representation of said segment may be specified in the request sent by the client terminal. In a variant, the request sent by the client terminal may only comprise the first representation.

In a particular embodiment, the first type cache is a HTTP Adaptive Streaming aware cache and the second type cache is a legacy cache.

In an aspect of this embodiment, said request being an HTTP request, said first additional information can be included within the cache control header of the response.

In a further aspect, said request being an HTTP request, said second additional information can be included within a further header of the response. In a variant, said second additional information can be included within the cache control header of the response.

The present invention also concerns a first type cache adapted to be arranged between a client terminal and at least one server, said first type cache being configured to receive, from the client terminal, a request for a first representation of a segment of a multimedia content, said multimedia content being available in a plurality of representations, characterized in that it comprises a further module configured to send a response to the client terminal which comprises:
one alternative representation of said segment, which is cached by said first type cache;
first additional information preventing a second type cache—arranged between the first type cache and the client terminal—from caching the alternative representation of said response; and
second additional information identifying the alternative representation of said response.

In addition, said first type cache can comprise a controlling module configured to check whether it has already cached the first representation of the request or at least one alternative representation of said segment in case the first representation is not cached.

In particular, said at least one alternative representation of said segment may be specified in the request sent by the client terminal. In a variant, the request sent by the client terminal can only comprise the first representation.

Moreover, said first type cache is a HTTP Adaptive Streaming aware cache and the second type cache is a legacy cache.

The present invention further concerns a terminal configured to send, to at least one server (SE), a request for at least a first representation of a segment of a multimedia content, said multimedia content being available in a plurality of representations,
wherein it comprises a communication module configured to receive a response from a first type cache arranged between said at least one server and said terminal, said response comprising:
one alternative representation of said segment, which is cached by said first type cache;
first additional information preventing a second type cache—arranged between the first type cache (DANE) and the client terminal—from caching the alternative representation of said response; and
second additional information identifying the alternative representation of said response, allowing a further first type cache to cache said alternative representation.

The present invention further concerns a computer program product downloadable from a communication network and/or recorded on a medium readable by computer and/or executable by a processor, comprising program code instructions for implementing the above mentioned method.

In addition, the present invention also concerns a non-transitory computer readable medium comprising a computer program product recorded thereon and capable of being run by a processor, including program code instructions for implementing the method previously described.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIGS. 1, 2A and 2B, the represented blocks are purely functional entities, which do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DESCRIPTION OF EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein.

According to a preferred embodiment, the present invention is depicted with regard to the HTTP adaptive streaming protocol (or HAS) and, in particular, with regard to MPEG-DASH. Naturally, the invention is not restricted to such a particular environment and other adaptive streaming protocol could of course be considered and implemented.

Figure 1:
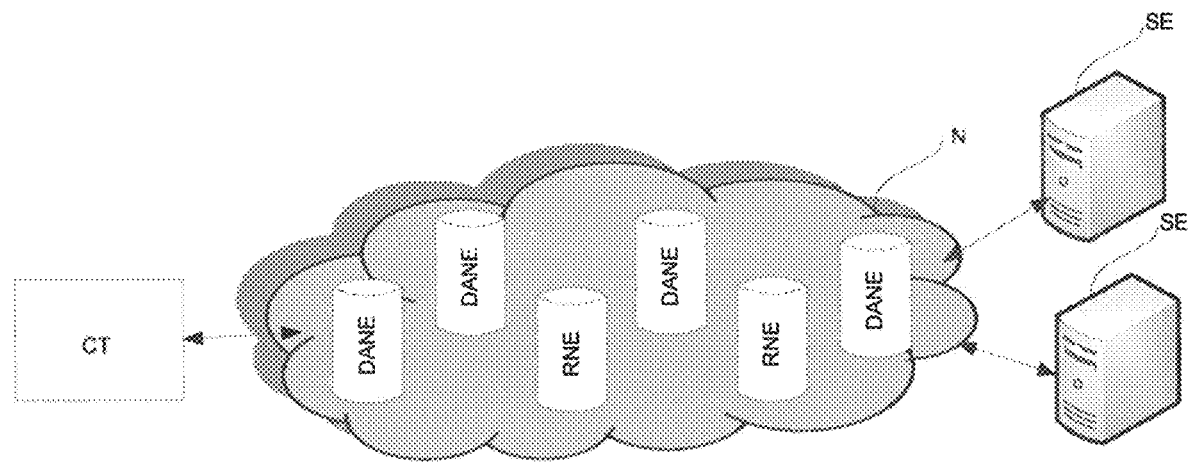
FIG. 1 is a schematic diagram of a Client-Server network architecture wherein the present invention might be implemented.

As depicted in FIG. 1, the Client-Server network architecture, supported by one or several networks N (only one is represented in the Figures), wherein the present invention might be implemented, comprises one or several client terminals CT (only one is represented in the Figures), one or more HTTP servers SE, a plurality of smart caches DANE and one or more legacy caches RNE. According to DASH, such servers SE are also named Media Origin. They generate for instance the media presentation description (or MPD), so called manifest. This is the source of content distribution: the multimedia content may come from some external entity and be converted to HAS format at the Media Origin.

A smart cache DANE is a caching element in the network N that is configured to understand that a HAS content is delivered. Using MPEG-DASH terminology, a smart cache is considered as DASH Aware Network Element (DANE).

A legacy cache RNE is a caching element in the network N which has no knowledge of the type of data that transits through it, or at least it does not understand the HAS aspects. In MPEG-DASH terminology, a legacy cache is considered as Regular Network Element (RNE).

The client terminal CT wishes to obtain a multimedia content from one of the HTTP servers SE. Said multimedia content is divided into a plurality of segments. It is assumed that the multimedia content is available at different representations at a server SE. The HTTP server SE is able to stream segments to the client terminal CT, upon the client request, using HTTP adaptive streaming protocol over one or more TCP/IP connections.

The client terminal CT can be a portable media device, a mobile phone, a tablet or a laptop, a TV set, a Set Top Box, a game device or an integrated circuit. Naturally, the client terminal CT might not comprise a complete video player, but only some sub-elements such as the ones for demultiplexing and decoding the media content and might rely upon an external means to display the decoded content to the end user. In this case, the client terminal CT is a HAS aware video decoder, such as a set-top box.

Figure 2A:
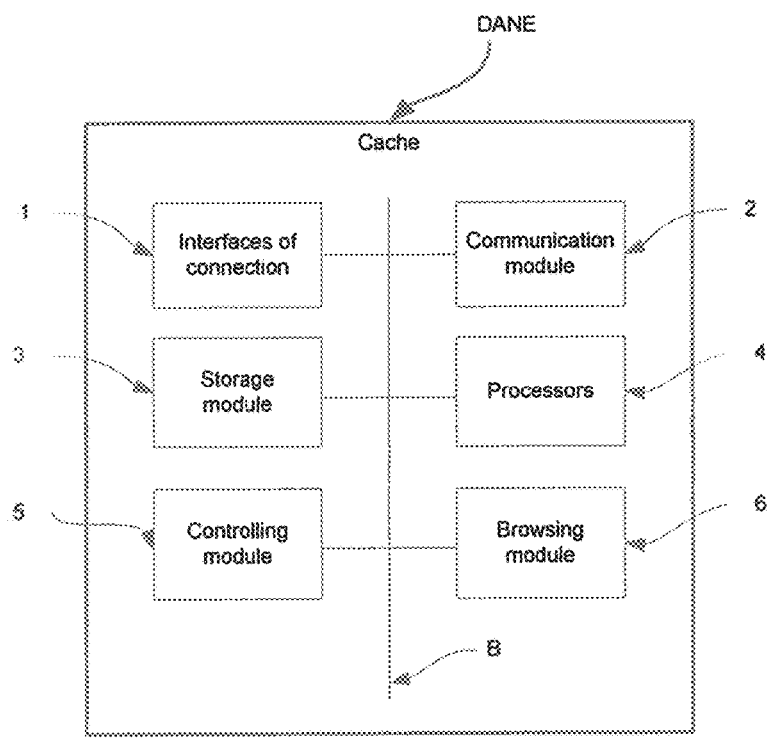
FIG. 2A is a block diagram of an example of a smart cache according to a preferred embodiment of the present invention.

As shown in FIG. 2A, a smart cache DANE comprises:
- one or more interfaces of connection 1 (wired and/or wireless);
- a communication module 2 comprising the protocol stacks to communicate through the interfaces of connection 1. In particular, the communicating module can comprise an Internet Protocol stack, noted IP stack;
- a storage module 3, such as a volatile memory and/or a permanent memory, for storing segments of multimedia contents received from one or more servers SE in order to transmit them to client terminals CT, requesting such multimedia contents;
- one or more processors 4 for executing the applications and programs, for instance, stored in the storage module 3;
- a controlling module 5 formed to check whether or not the smart cache DANE has already cached the first representation of a request (sent by a client terminal CT) requesting a first representation or one alternative representation of a list when the first representation is not cached;
- a browsing module 6 adapted to browse, in order of preference, alternative representations listed in a request sent by a client terminal CT, in case the first representation is not cached. In a variant, the controlling module and the browsing module may define only one module;
- an internal bus B to connect the various modules, processing means and all means well known to the skilled in the art for performing the generic residential gateway functionalities.

Figure 2B:
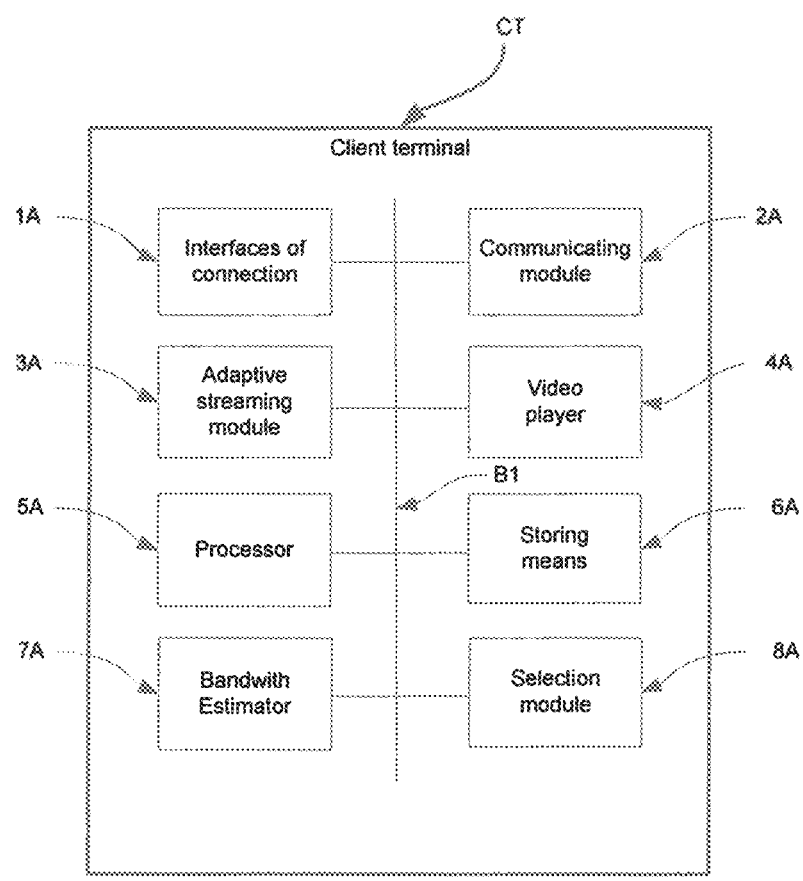
FIG. 2B is a block diagram of an example of a client terminal according to a preferred embodiment of the present invention.

As shown in FIG. 2B, the client terminal CT comprises at least:
- one or more interfaces of connection 1A (wired and/or wireless, as for example Wi-Fi, Ethernet, ADSL, Cable, Mobile and/or Broadcast (e.g. DVB, ATSC) interface);
- a communication module 2A containing the protocol stacks to communicate to the HTTP server SE. In particular the communication module 2A comprises the TCP/IP stack well known in the art. Of course, it could be any other type of network and/or communicating means enabling the client terminal CT to communicate to the HTTP server SE;
- an adaptive streaming module 3A which receives the HTTP streaming multimedia content from the HTTP server SE. It continually selects the segment at the bit rate(s) that better matche(s) the network constraints and its own constraints based on information from a selection module 8A;
- a video player 4A adapted to decode and render the multimedia content;
- one or more processors 5A for executing the applications and programs stored in a non-volatile memory of the client terminal CT;
- storing means 6A, such as a volatile memory, for buffering the segments received from the HTTP server SE before their transmission to the video player 4A;
- a bandwidth estimator 7A configured for estimating the bandwidth of the transmission path;
- the selection module 8A configured for determining a set of allowable representations the client terminal CT might request. The allowable representations are selected among the available representations of a given segment of the multimedia content, as listed in the associated manifest. In particular, the determination—by the module 8A—of the set of allowable representations of the given segment can be based on one or several performance criteria (as for instance the bandwidth estimated, capabilities of the client terminal, representation of the previously requested segment, quality of experience required by an end user of the client terminal CT, etc.). In a variant, the selection module 8A might be integrated within the adaptive streaming module 3A;

an internal bus B1 to connect the various modules and all means well known to the skilled in the art for performing the generic client terminal functionalities.

In the following, it is assumed that a given client terminal CT sends a request on the network N to obtain a given segment of a multimedia content. Said request specifies a first representation and one or more alternative representations of said given segment, which are browsed in order of preference when the first representation is not available at a smart cache DANE receiving the request.

According to the preferred embodiment, the communication module 2 of the smart cache DANE is further configured to send to the client terminal CT—when the first representation is not cached by said smart cache DANE (after a check of the controlling module 5)—a response comprising:
- one of the alternative representations of the request, which is cached by the smart cache DANE;
- first additional information preventing any legacy cache RNE—located between the smart cache DANE and the client terminal CT—from caching the alternative representation of the response (returned by the smart cache DANE). For instance, said first additional information is included within the cache control header of the response (e.g. Cache-control: no-cache, unless-altlist-capable, wherein "altlist" is a directive used to specify alternative representations of a segment in the request); and
- second additional information identifying the alternative representation of said response. As an example, said second additional information is included within a further header of the response to indicate the URL of the alternative representation returned (e.g. X-altlist-location: B, B being the said URL), so that an intermediate smart cache DANE (located between the considered smart cache DANE providing the alternative representation and the client terminal CT) becomes aware of the representation delivered to the client terminal CT.

When the first representation of the request is already stored in the smart cache DANE, the status code 200 of the HTTP protocol (meaning that the request has been successfully treated) is attached with the response sent by said smart cache DANE, devoid of said first and second additional information.

When the first representation requested is not cached by the smart cache DANE but one alternative representation listed in the request is stored, the status code 200 is also attached with the response sent by the smart cache DANE with, in this case, the first and second additional information attached.

Thanks to the preferred embodiment, the response sent by the smart cache DANE explicitly indicates—when the representation returned is not the first representation—which alternative representation of the request has been delivered by the smart cache DANE. Thus, any further smart cache DANE, located between the smart cache DANE sending the response and the client terminal CT, could be aware that the returned representation is not the first representation, but an alternative representation listed in the request. In addition, legacy caches RNE, between the smart cache DANE and the client terminal CT, could not cache the response to prevent them from later delivering to a further client terminal an alternative representation, believing that it is the first representation of the request.

Figure 3:
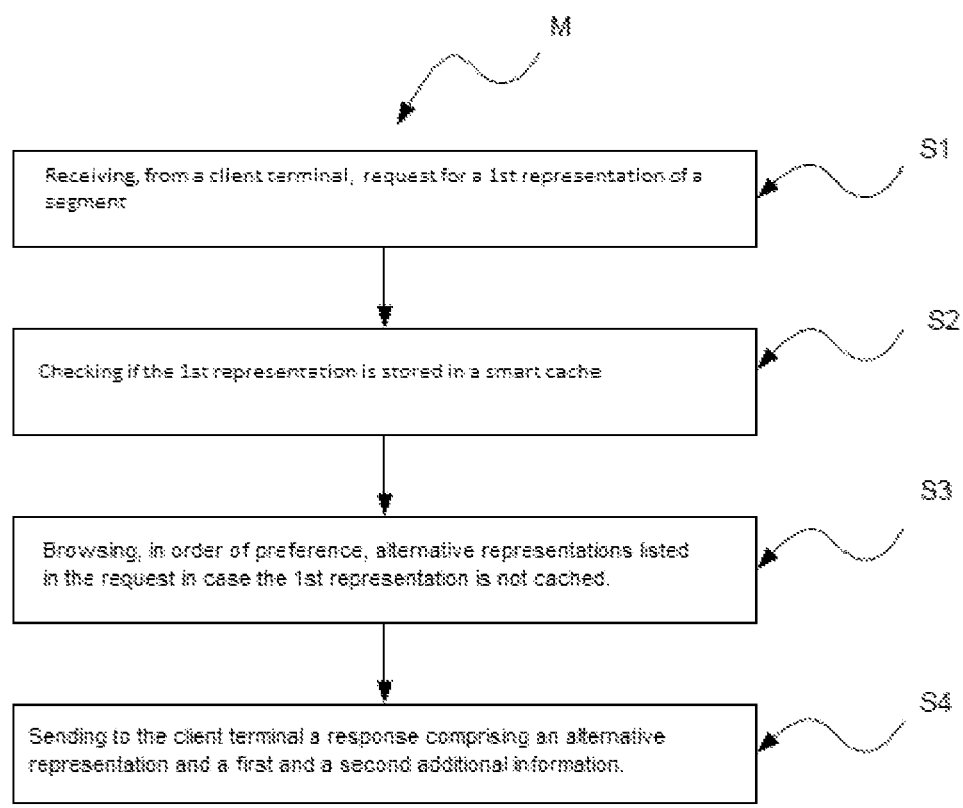
FIG. 3 is a flow chart illustrating the method for operating the smart cache of the FIG. 2A, according to the preferred embodiment.

As illustrated in FIG. 3, according to said preferred embodiment, the smart cache DANE is configured to implement the following mechanism M for providing a requested representation of a given segment of an HAS multimedia content to a client terminal CT.

Said mechanism M comprises the steps of:
- receiving (step S1), from the client terminal CT, an HTTP request for a first representation of the given segment belonging to a set of allowable representations as previously defined. The HTTP request further comprises a list of alternative representations which might be requested in case the first representation is not cached by the smart cache DANE;
- checking (step S2) if the first representation is stored in the storage module 9 of the smart cache DANE;
- browsing (step S3), in order of preference, alternative representations listed in the request in case the first representation is not cached;
- sending (step S4) to the client terminal CT—when the first representation is not cached by said cache DANE but an alternative representation of the request is cached—a response comprising:
  - said cached alternative representation;
  - first additional information preventing any legacy cache RNE between the smart cache DANE and the client terminal CT, from caching the alternative representation of the response; and
  - second additional information identifying the alternative representation of the response.

When, none of alternative representations of the request is cached, the smart cache DANE may release the request towards the server S. In a variant, the smart cache DANE can send a message (such an error message) to the client terminal.

It should be understood that the order of the steps S0 to S4 may be changed, at least partially, without departing from the present invention.

In a variant of the preferred embodiment, the request sent by the client CT may only comprise the first representation without any alternative representation in case said first representation is not cached by the smart cache DANE. In this case, the controlling module 5 of the smart cache DANE is further configured to check whether it has already cached one alternative representation (e.g. with a bit rate at most equal to the bit rate of the first representation) of the segment in case the first representation is not cached. When one alternative representation is cached, the communication module 2 sends the response with said alternative representation.

It should be noted that the smart cache DANE may be integrated in a proxy, in a gateway or in any other suitable network equipment.

The flowchart and/or block diagrams in the Figures illustrate the configuration, operation and functionality of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a random access memory (RAM); a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method for operating a first type cache adapted to be arranged between a client terminal and at least one server, said first type cache being configured to receive a request from the client terminal for a segment of a multimedia content available in a plurality of representations, said method comprising:
  receiving, from the client terminal, a request for at least a first representation of a segment,
  in case the first representation is not cached, browsing, in order of preference, alternative representations listed in the request, and
  sending to the client terminal, when the first representation is not cached by said first type cache, a response comprising:
    one alternative representation of said segment, which is cached by the first type cache;
    first additional information, wherein, by the first additional information, a second type cache that is arranged between the first type cache and the client terminal is configured to be prevented from caching the alternative representation that is in the response and that has been cached by the first type cache; and
    second additional information indicating, when the returned representation is not the first representation of the request, which alternative representation of the request has been delivered by the first type cache, allowing a further first type cache arranged between the first type cache and the client terminal to be aware that the returned representation is not the first representation but an alternative representation of the request, wherein the first type cache is a HTTP Adaptive Streaming aware cache and the second type cache is a legacy cache.

2. The method according to claim 1, wherein, preliminary to the sending, said first type cache checks whether the cache has already cached one alternative representation of said segment in case the first representation is not cached.

3. The method according to claim 2, wherein at least one alternative representation of said segment is specified in the request sent by the client terminal.

4. The method according to claim 2, wherein the request sent by the client terminal only comprises the first representation.

5. The method according to claim 1, wherein, said request being an HTTP request, said first additional information is included within a cache control header of the response.

6. The method according to claim 5, wherein, said request being an HTTP request, said second additional information is included within a further header of the response.

7. A first type cache adapted to be arranged between a client terminal and at least one server, said first type cache being configured to receive, from the client terminal, a request for at least a first representation of a segment of a multimedia content, said multimedia content being available in a plurality of representations,
  wherein the cache comprises a memory and one or more processors configured to:
  browse, in order of preference, alternative representations listed in the request in case the first representation is not cached by the cache, and
  send a response to the client terminal which comprises:
    one alternative representation of said segment, which is cached by said first type cache;
    first additional information, wherein, by the first additional information, a second type cache that is arranged between the first type cache and the client terminal is configured to be prevented from caching the alternative representation that is in the response and that has been cached by the first type cache; and
    second additional information indicating, when the returned representation is not the first representation of the request, which alternative representation of the request has been delivered by the first type cache, allowing a further first type cache arranged between the first type cache and the client terminal to be aware that the returned representation is not the first representation but an alternative representation of the request, wherein said first type cache is a HTTP Adaptive Streaming aware cache and the second type cache is a legacy cache.

8. The first type cache according to claim 7, wherein said one or more processors are further configured to check whether the cache has already cached the first representation of the request or at least one alternative representation of said segment in case the first representation is not cached.

9. The first type cache according to claim 8, wherein said at least one alternative representation of said segment is specified in the request sent by the client terminal.

10. The first type cache according to claim 8, wherein the request sent by the client terminal only comprises the first representation.

11. A non-transitory computer-readable medium comprising a computer program product recorded thereon and capable of being run by a processor, including program code instructions for implementing a method for operating a first type cache adapted to be arranged between a client terminal and at least one server, said first type cache being configured to receive a request from the client terminal for a segment of a multimedia content available in a plurality of representations, said method comprising:

receiving, from the client terminal, a request for at least a first representation of a segment, in case the first representation is not cached, browsing, in order of preference, alternative representations listed in the request, and sending to the client terminal, when the first representation is not cached by said first type cache, a response comprising:

one alternative representation of said segment, which is cached by the first type cache;

first additional information, wherein, by the first additional information, a second type cache that is arranged between the first type cache and the client terminal is configured to be prevented from caching the alternative representation that is in the response and that has been cached by the first type cache; and second additional information indicating, when the returned representation is not the first representation of the request, which alternative representation of the request has been delivered by the first type cache, allowing a further first type cache arranged between the first type cache and the client terminal to be aware that the returned representation is not the first representation but an alternative representation of the request, wherein the first type cache is a HTTP Adaptive Streaming aware cache and the second type cache is a legacy cache.

\* \* \* \* \*